United States Patent [19]

Shaughnessy

[11] Patent Number: 5,787,431

[45] Date of Patent: Jul. 28, 1998

[54] DATABASE DEVELOPMENT SYSTEM WITH METHODS FOR JAVA-STRING REFERENCE LOOKUPS OF COLUMN NAMES

[75] Inventor: Steven T. Shaughnessy, Scotts Valley, Calif.

[73] Assignee: Borland International, Inc., Scotts Valley, Calif.

[21] Appl. No.: 767,167

[22] Filed: Dec. 16, 1996

[51] Int. Cl.⁶ .................................................... G06F 17/00

[52] U.S. Cl. ........................... 707/100; 707/1; 707/3; 707/100; 707/103; 370/392; 370/477; 395/555; 395/416; 395/701; 395/705

[58] Field of Search ......................... 395/701, 705, 395/555, 416; 370/392, 477; 707/1, 100, 3

[56] References Cited

U.S. PATENT DOCUMENTS

| | | | |
|---|---|---|---|
| 4,961,139 | 10/1990 | Hong et al. | 707/1 |
| 5,465,352 | 11/1995 | Nakazawa et al. | 707/3 |
| 5,477,537 | 12/1995 | Dankert et al. | 370/392 |
| 5,526,363 | 6/1996 | Weiss et al. | 370/477 |
| 5,615,362 | 3/1997 | Jensen et al. | 707/103 |
| 5,657,480 | 8/1997 | Jacobson | 395/555 |
| 5,724,538 | 3/1998 | Morris et al. | 395/416 |

*Primary Examiner*—Thomas G. Black
*Assistant Examiner*—Thuy Pardo
*Attorney, Agent, or Firm*—John A. Smart

[57] ABSTRACT

A Java-based rapid application development (RAD) environment for creating applications providing named-based programmatic access to information from columns in databases is described. For increasing the efficiency by which named-based references to database columns are processed by application programs, the system provides methodology for rapid lookups of column names, using a reference cache storing 32-bit references to immutable strings (e.g., Java strings). The reference cache is preferably constructed as a least-recently allocated cache, thereby allowing allocation to occur in a round-robin fashion, with the oldest item allocated being the first item bumped from cache when the cache overflows. Each cache entry stores a reference (e.g., four-byte pointer or handle to a string) and an ordinal entry (i.e. the corresponding database ordinal). As a reference to a particular database column occurs during execution of a program, the reference cache fills with a reference to that column name as well as the corresponding column ordinal. Accordingly, program execution proceeds with comparison of existing items in the cache, using a sequence of rapid, in-line comparisons involving simple data types (e.g., 32-bit references for the column name string). This approach minimizes the need to perform hash lookups or string comparison operations.

20 Claims, 4 Drawing Sheets

DATABASE DEVELOPMENT SYSTEM WITH METHODS FOR JAVA-STRING REFERENCE LOOKUPS OF COLUMN NAMES

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to system and method for creating and executing application programs and other software and, particularly, to system and method for improving execution of such programs in a database environment.

With the explosive growth of the Internet and the World Wide Web, an ever-increasing number of computers of disparate platforms are being connected together. As a result, there is renewed interest in distributing software in binary format which operates in this ever-increasing heterogeneous environment. In the early 1990s, a team at Sun Microsystems developed a new language, "Java," to address the issues of software distribution on the Internet. Java is a simple, object-oriented language which supports multi-thread processing and garbage collection. Although the language is based on C++, a superset of C, it is much simpler. More importantly, Java programs are "compiled" into a binary format that can be executed on many different platforms without recompilation. The language includes built-in mechanisms for verifying and executing Java "binaries" in a controlled environment, protecting the user's computer from potential viruses and security violations.

A typical Java system comprises the following set of interrelated technologies: a language specification; a compiler for the Java language that produces bytecodes from an abstract, stack-oriented machine; a virtual machine (VM) program that interprets the bytecodes at runtime; a set of class libraries; a runtime environment that includes bytecode verification, multi-threading, and garbage collection; supporting development tools, such as a bytecode disassembler; and a browser (e.g., Sun's "Hot Java" browser).

Java is designed for creating applications that will be deployed in heterogeneous networked environments. Such environments are characterized by a variety of hardware architectures. Further, applications in such environments execute atop a variety of different operating systems and interoperate with a multitude of different programming language interfaces. To accommodate such diversity, the Java compiler generates platform-neutral "bytecodes"—an architecturally neutral, intermediate format designed for deploying application code efficiently to multiple platforms.

Java bytecodes are designed to be easy to interpret on any machine. Bytecodes are essentially high-level, machine-independent instructions for a hypothetical or "virtual" machine that is implemented by the Java interpreter and runtime system. The virtual machine, which is actually a specification of an abstract machine for which a Java language compiler generates bytecode, must be available for the various hardware/software platforms which an application is to run. The Java interpreter executes Java bytecode directly on any machine for which the interpreter and runtime system of Java have been ported. In this manner, the same Java language bytecode runs on any platform supported by Java.

Compiling Java into platform-neutral bytecodes is advantageous. Once the Java language interpreter and runtime support are available on a given hardware and operating system platform, any Java language application can be executed. The bytecodes are portable since they do not require a particular processor, architecture, or other proprietary hardware support. Further, the bytecodes are byte-order independent, so that programs can be executed on both big-endian machines (e.g., Intel architecture) and little-endian machines (e.g., Motorola architecture). Since Java bytecodes are typed, each specifies the exact type of its operands, thereby allowing verification that the bytecodes obey language constraints. All told, the interpreted bytecode approach of compiled Java language programs provides portability of programs to any system on which the Java interpreter and runtime system have been implemented.

The bytecodes are actually stored in "class" files. Each class file stores all the information for a particular Java class. A "class" in Java is a software construct which defines instance variables and methods, in effect, serving as a template for creating objects of a particular type. In this regard, a Java class is akin to a C++ class. A very simple "Point" class, for instance, may be declared as follows.

```
class Point {
    public double x;   /* instance variable */
    public double y;   /* instance variable */
}
```

This declaration serves as a template from which "Point" objects can be instantiated.

Actual instantiation of an object occurs in a manner similar to that found in the C++ programming language. For example, a variable which refers to a "Point" object can be declared as follows:

Point myPoint;

An instance of a point object is allocated as follows.

mypoint=new Point( );

Here, one can now access variables of the "Point" object, using familiar "dot" notation for referring to the names of the variables.

myPoint•x=10;

myPoint•y=20;

Objects communicate by sending messages to each other. A recipient object responds to a message by selecting a particular method to execute. If one object wants another object to do some work on its behalf, for instance, the first object sends a message to the second object. The second object, in response, invokes the method which is appropriate for processing the message. The methods themselves, therefore, define the behavior of objects instantiated from a class. In particular, it is an object's methods which manipulate the object's data—its instance variables.

Further description of the Java Language environment can be found in Gosling, J. et al., *The Java Language Environment: A White Paper*, Sun Microsystems Computer Company, October 1995, the disclosure of which is hereby incorporated by reference.

"Visual" development environments, such as Borland's Delphi™, Microsoft® Visual Basic, Microsoft® J++, and Powersoft's PowerBuilder™, are rapidly becoming preferred development tools for quickly creating production applications, including those created in with the Java programming language. Such environments are characterized by an integrated development environment (IDE) providing a form painter, a property getter/setter manager ("inspector"), a project manager, a tool palette (with objects which the user can drag and drop on forms), an editor, a compiler, and a linker. In general operation, the user "paints" objects on one or more forms, using the form painter. Attributes and properties of the objects on the forms can be modified using the property manager or inspector. In conjunction with this operation, the user attaches or associates program code with particular objects on screen (e.g., button object); the editor is used to edit program code which has been attached to particular objects.

When developing applications for deployment in database environments, regardless of which language or development tool is employed, a problem exists as to how one identifies a database column or field within one's program. Currently, two techniques are employed. One approach is to identify a database column by field ordinal—an integer offset into a column array. Another approach is to identify a column by name, such as "Account No." The advantage of the first approach is that an ordinal reference is highly efficient during runtime execution, as it is simply a subscript into an array. The advantage of the second approach, on the other hand, is that it increases readability of one's source code, thus facilitating development and maintenance of the database program. Consider, for instance, a call in one's program code to access a column by name (literal string):

Customer.fetchAsInteger("Account No.")

This is far more readable than accessing the column by ordinal

Customer.fetchAsInteger(ColumnArray[3])

Expectedly, code which accesses columns by name is easier to create, debug, and maintain.

Moreover, use of ordinal references has a pronounced disadvantage. If the underlying database table were to restructure (e.g., the user altered the database table to add or delete columns), all ordinal references in the code which depend on those columns are rendered invalid. In such a case, the ordinal references must be updated, including the arduous task of recompiling the application program (once the new ordinal references have been coded). Use of ordinals, therefore, entails placing a dependency in one's program code which might, at a future date, invalidate the program. Column references based on field names, in contrast, are better able to survive such restructurings. Although columns might be shifted around during a table restructure, the application is able to correctly resolve columns at runtime as long as the individual column or field names have not themselves been changed.

Given the ever-increasing complexity of creating and maintaining software programs, programmers today have largely favored ease-of-use over efficiency. Expectedly, the text string approach to accessing columns in a program has won favor over the more-cryptic (albeit more efficient) ordinal technique. As a result, there is much interest in improving performance of the use of column names (literal strings) in one's program.

One technique for improving use of text column names is to employ a hash lookup of column names. A typical implementation would require: (1) actually examining the values of the strings, (2) hashing on those values (using an appropriate hash function), and (3) examining the results against a corresponding hash table. This technique is typically faster than a linear search through a table or list of column names. Even if one were to improve text lookups (e.g., using hashing, indexing, or the like), however, one is still faced with the task of performing multiple text string comparisons—a computationally expensive operation.

This performance cost is brought to the forefront in database applications, where a reference to a particular column might occur hundreds or thousands of times in the span of just a few lines of program code. Specifically, database applications tend to employ column references in performance-critical loops (e.g., tight "scan" loops), where thousands or millions of rows are sequentially referenced. Although the number of different columns for a given database table is typically small, say less than 10-15 columns, the use of column references in tight execution loops make them particularly sensitive to inefficiencies, such as expensive string comparison operations. Accordingly, there exists great interest in increasing the efficiency by which named-based column references are processed in a computer program.

SUMMARY OF THE INVENTION

A development system of the present invention provides a Java-based rapid application development (RAD) environment allowing users to create application programs having name-based programmatic access to information from database columns. At the level of the user interface, the (designer) user creates a database form by placing one or more "data aware" controls on a form. Each data aware control, which includes grid control and field control functionality, communicates with a data cursor. A data cursor is responsible for navigation through a database table, as well as supporting various views of database tables; each table comprises a plurality of data records or rows, organized by various categories or columns of information. Programmatic access to databases is achieved by opening a data cursor on a "data set."

For increasing the efficiency by which named-based references to database columns are processed in a computer program, the present invention introduces methodology for reference lookups of column names, in an implementation employing Java strings. The general methodology is as follows. At the outset, a reference cache is established, for caching references (e.g., pointers or handles) to strings. When a name request is received (e.g., "Account No."), a column name lookup is required, for determining the corresponding ordinal for the column. In an application program, for instance, a request for processing database information might include reference to a particular database column, Customer ID, by name: iCurrCust= Customer.fetchAsInteger("Customer ID"). Internally, to process information from that column, the system must determine the ordinal position for that column.

The first time the system performs a request with a given name, the system will not find the name in the reference cache. Accordingly, it must perform a conventional lookup (e.g., hash lookup), including performing a more-expensive string comparison operation. Once the name is located, it is placed in the reference cache.

In a preferred environment, the reference cache is constructed as a least-recently allocated cache. This allocation occurs in a round-robin fashion, with the oldest item allocated being the first item discarded or "bumped" from cache when the cache is full. Alternatively, a least-recently used (LRU) aging scheme may be employed. For most embodiments, however, the processing overhead of an LRU approach is not offset by better cache performance. The following information is stored with each cache entry:

(1) a reference (e.g., four-byte pointer or handle to a string); and (2) an ordinal entry (i.e. the corresponding database ordinal).

In a preferred environment, the cache is set to a size of twenty entries or items, as most database tables will have twenty or fewer columns in use at a given time.

The next time a request is received for the particular column name, the system performs an in-line comparison on the cache entries. If a matching entry is found, the system passes the corresponding ordinal back. A sequence of in-line tests is preferably used instead of stepping through an array (i.e., by incrementing a subscript value) because it is more efficient, particularly in Java-based environments. Array processing in such environments is relatively expensive. For instance, overhead is incurred with subscript processing of an array. Additional overhead is incurred with computationally-expense array bound checking which occurs in such environments. By avoiding an array approach, the overhead which accompanies array processing is avoided. Moreover, when programs are compiled (i.e., by a native compiler or by a just-in-time compiler), the sequence of comparison operations exists as a sequence of rapid, in-line 32-bit comparison operations (e.g., integer comparison operations).

On subsequent lookup of a string from a user application, the system proceeds with comparison of existing items in the cache, using the (32-bit or four byte) reference for the column name string (instead of the more-expensive hash table/string comparison approach). Here, when the expensive lookup is first performed, a reference to that column name as well as the column ordinal are stored in the cache. As a result, subsequent lookups do not require hash lookups or string comparison operations.

DETAILED DESCRIPTION OF A PREFERRED EMBODIMENT

The following description will focus on a preferred embodiment of the present invention (and certain alternatives) embodied in a visual development environment running on an Intel 80x86-compatible computer operating under an event-driven operating system, such as the Microsoft® Windows environment. The present invention, however, is not limited to any particular application or any particular environment. Instead, those skilled in the art will find that the system and methods of the present invention may be advantageously applied to a variety of platforms and environments, whether command-line or GUI based, including MS-DOS, Macintosh, UNIX, NextStep, and the like. Therefore, the description of the exemplary embodiments which follows is for purposes of illustration and not limitation.

General Architecture

A. System Hardware

Figure 1A:
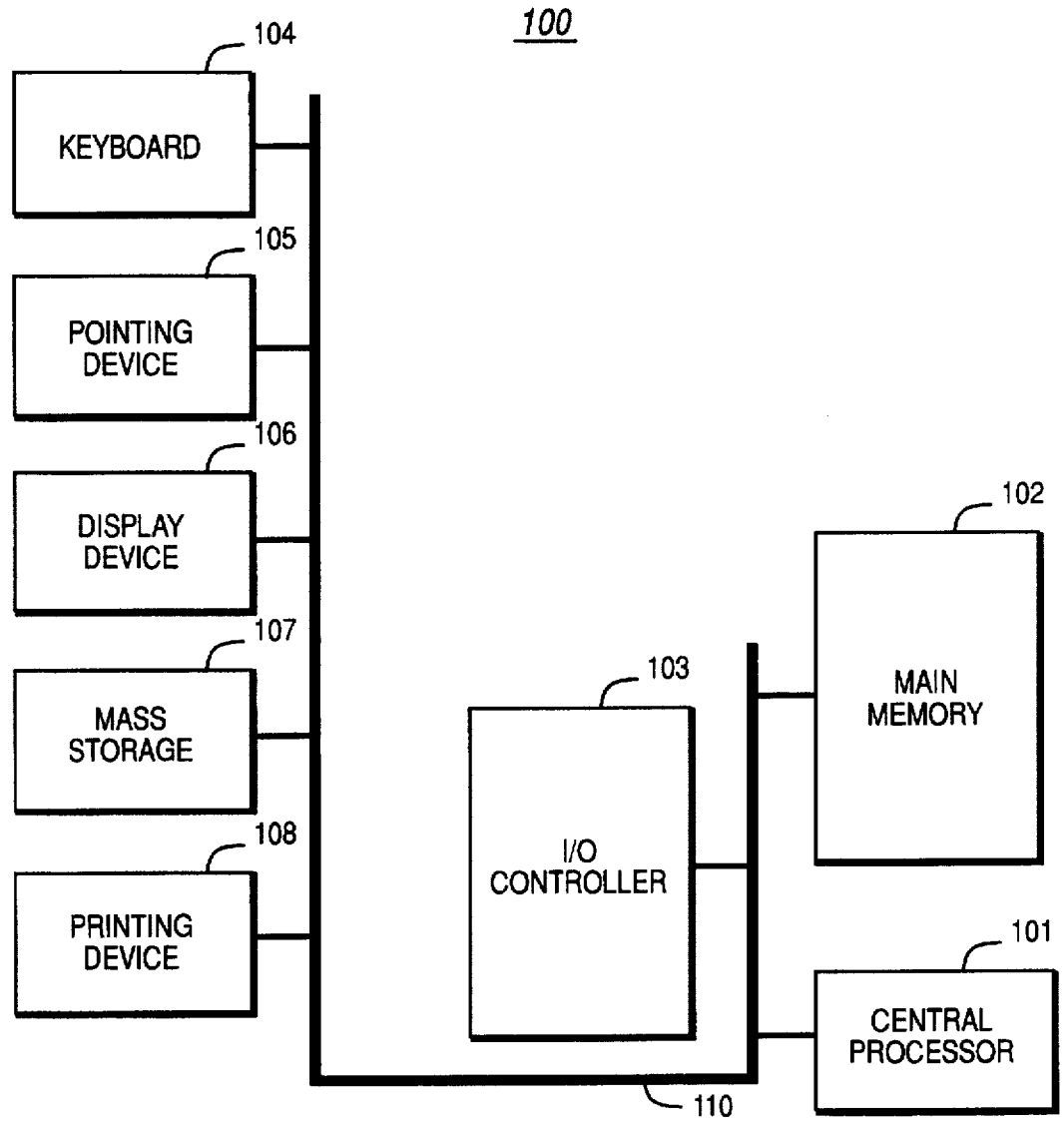
FIG. 1A is a block diagram of a computer system in which the present invention may be embodied.

The present invention may be embodied on a computer system such as the system 100 of FIG. 1A, which includes a central processor 101, a main memory 102, an input/output controller 103, a keyboard 104, a pointing device 105 (e.g., mouse, track ball, pen device, or the like), a display device 106, and a mass storage 107 (e.g., removable disk, floppy disk, fixed disk, optical disk (including CD-ROM), and the like). Additional input/output devices, such as a printing device 108, may be provided with the system 100 as desired. As shown, the various components of the system 100 communicate through a system bus 110 or similar architecture. In a preferred embodiment, the system 100 includes an IBM-compatible personal computer, available from a variety of vendors (including IBM of Armonk, N.Y.).

B. System Software

Figure 1B:
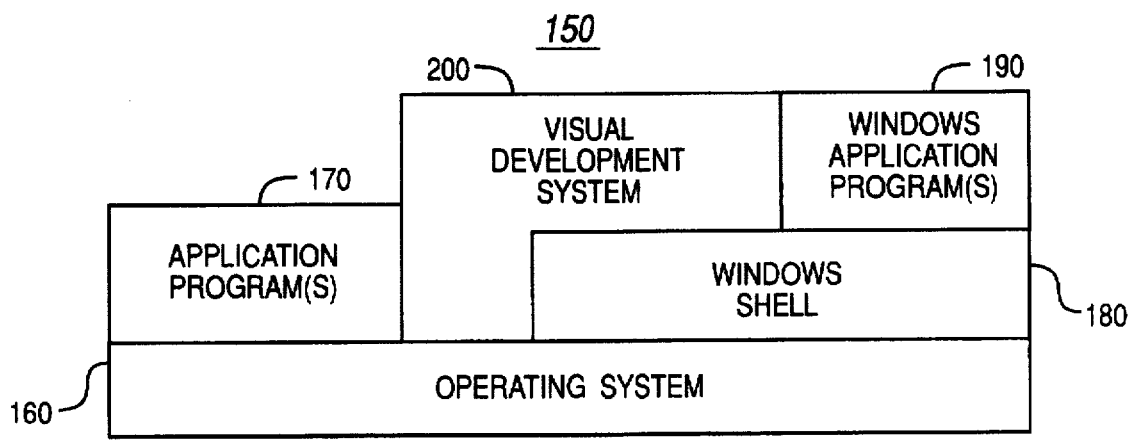
FIG. 1B is a block diagram of a software system for controlling the operation of the system of FIG. 1A.

Illustrated in FIG. 1B, a computer software system 150 is provided for directing the operation of the computer system 100. Software system 150, which is stored in system memory 102 and/or on disk storage 107, includes a kernel or operating system (OS) 160 and a windows shell or interface 180. One or more application programs, such as application programs 170 or windows applications programs 190, may be "loaded" (i.e., transferred from storage 107 into memory 102) for execution by the system 100. OS 160 and shell 180, as well as application software 170, 190, include an interface for receiving user commands and data and displaying results and other useful information. Software system 150 also includes a visual development system 200 of the present invention for developing system and application programs. As shown, the development system 200 includes components which interface with the system 100 through windows shell 180, as well as components which interface directly through OS 160.

In a preferred embodiment, operating system 160 and windows shell 180 are provided by Microsoft® Windows 95/Windows NT, available from Microsoft Corporation of Redmond, Wash. Those skilled in the art will appreciate that the system may be implemented in other platforms, including Macintosh, UNIX, and the like. Development system 200, on the other hand, includes Delphi™, available from Borland International of Scotts Valley, Calif. (Part No. HDA1320USCU180). Application software 170, 190 can be any one of a variety of software applications, such as word processing, database, spreadsheet, text editors, and the like, including those created by the development system 200.

C. Development System

Figure 2A:
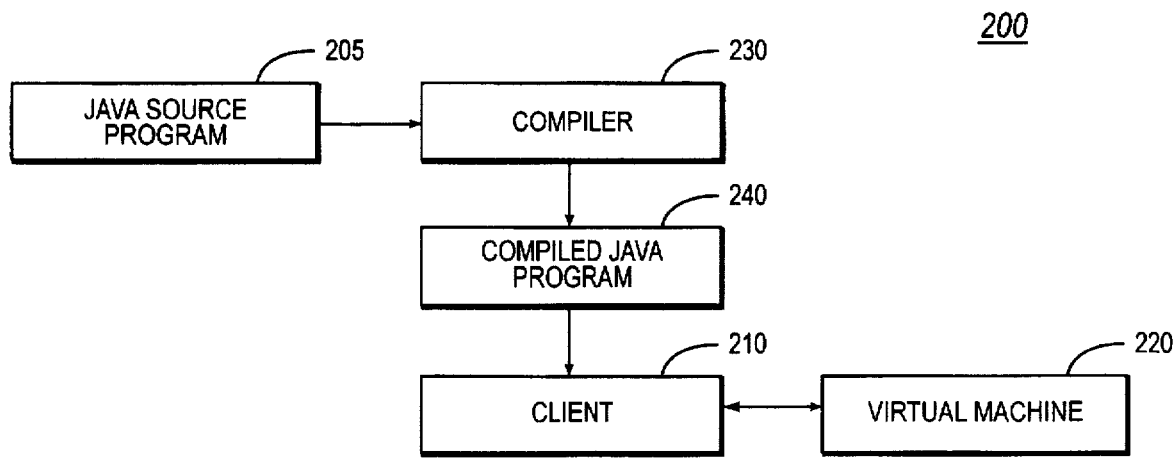
FIG. 2A is a block diagram of a Java development system.

Shown in further detail in FIG. 2A, a Java development system 200 of the present invention includes a client 210 which employs a virtual machine 220 for executing programs. In particular, the client 210 executes a "compiled" (i.e., bytecode or pseudo-compiled) Java program 240, which has been created by compiling a Java source code program or script 205 with a Java compiler 230. Here, the Java source code program 205 is an application program written in the Java programming language; the pseudo-compiled program 240, on the other hand, comprises the bytecode emitted by the compiler 230. The virtual machine 220 includes a runtime interpreter for interpreting the Java bytecode program 240. During operation, the client 210 simply requests the virtual machine 220 to execute a particular Java compiled program.

Figure 2B:
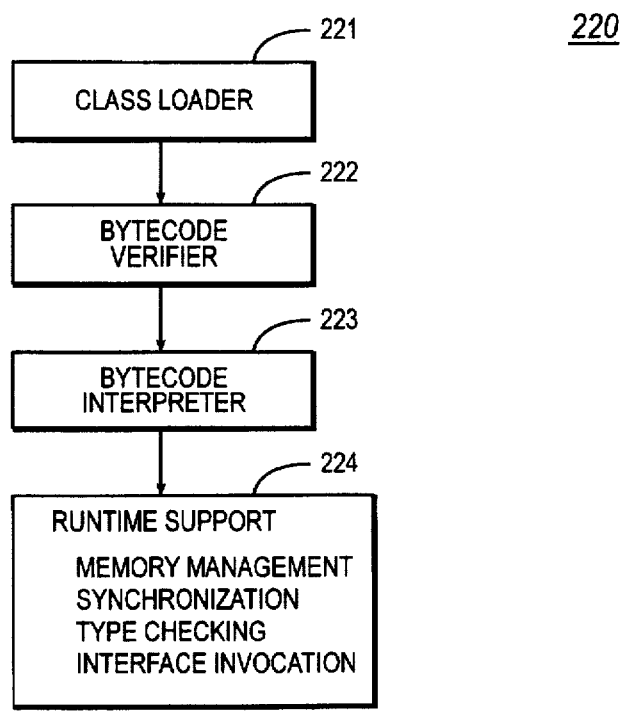
FIG. 2B is a block diagram showing further detail of the virtual machine of the Java development system of FIG. 2A.

As shown in FIG. 2B, the virtual machine 220 comprises a class loader 221, a bytecode verifier 222, a bytecode interpreter 223, and runtime support libraries 224. The class loader 221 is responsible for unpacking the class file which has been requested by a client. Specifically, the loader will unpack different sections of a file and instantiate in-memory corresponding data structures. The class loader will invoke itself recursively for loading any superclasses of the current class which is being unpacked.

The bytecode verifier 222 verifies the bytecode as follows. First, it checks whether the class has the correct access level. Since the class will access other classes for invoking their methods, the bytecode verifier must confirms that appropriate access is in place. Additionally, the bytecode verifier confirms that the bytecode which comprises the methods is not itself corrupt. In this regard, the bytecode verifier confirms that the bytecode does not change the state of the virtual machine (e.g., by manipulating pointers).

Once the bytecode has been verified, a "class initializer" method is executed. It serves, in effect, as a constructor for the class. The initializer is not a constructor in the sense that it is used to construct an instance of a class—an object. The class initializer, in contrast, initializes the static variables of the class. These comprise the variables which are present only once (i.e., only one instance), for all objects of the class.

Runtime support libraries 224 comprise functions (typically, written in C) which provide runtime support to the virtual machine, including memory management, synchronization, type checking, and interface invocation. At the client, runtime support libraries 224 are included as part of the virtual machine; the libraries are not downloaded with the Java application. The bytecode which is executed repeatedly calls into the runtime support libraries 224, for invoking various Java runtime functions.

D. General development interface

The present invention is embodied in a component-based, rapid application development (RAD) Java environment. Many of the traditional requirements of programming, particularly for GUI applications, are handled for the programmer automatically by the system.

Figure 3:
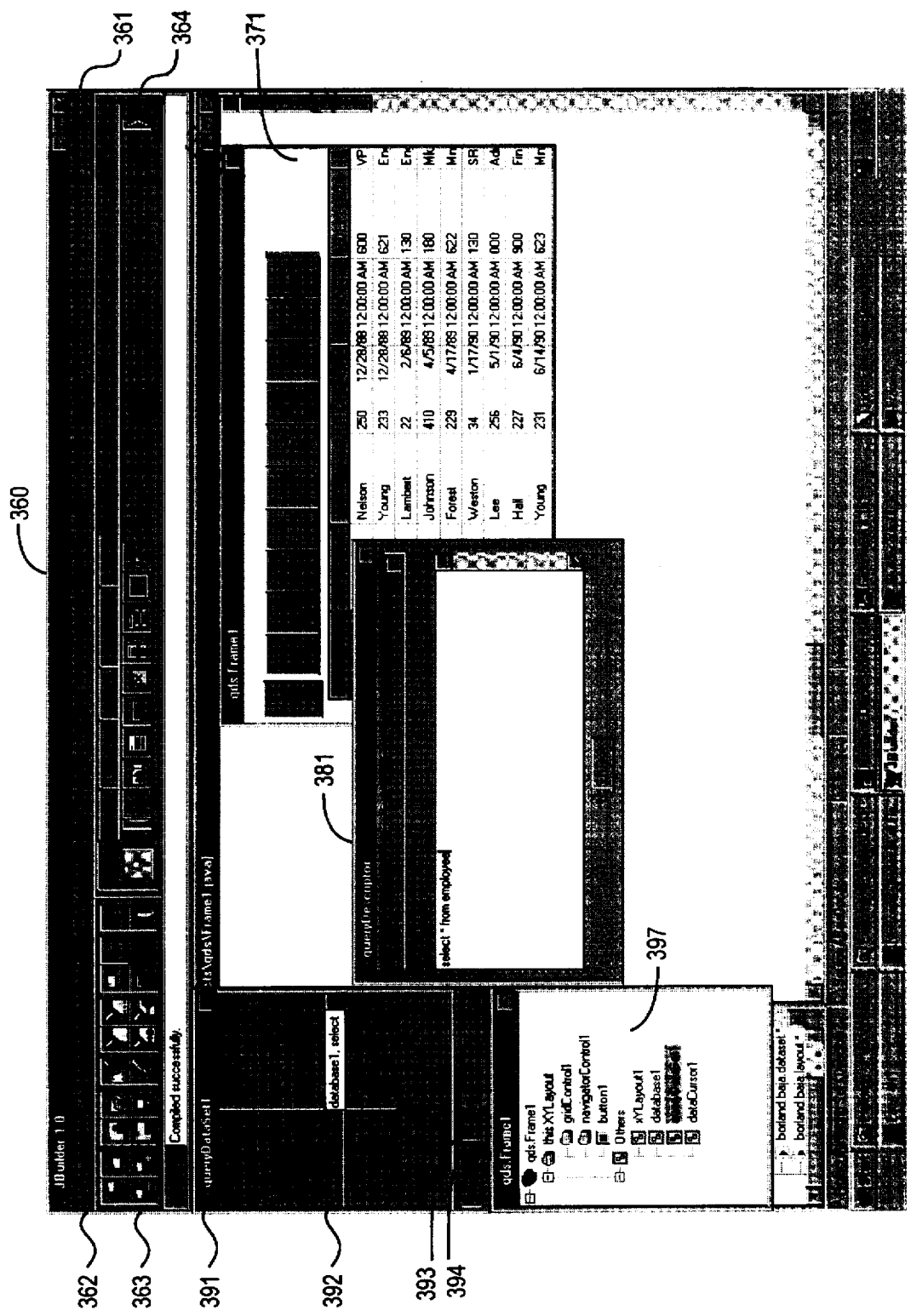
FIG. 3 is a bitmap screenshot illustrating a preferred interface of a Java-based visual development system of the present invention.

FIG. 3 illustrates a preferred interface of a Java-based visual development or programming environment 360 provided by the system. As shown, the programming environment 360 comprises a main window 361, a form 371, a editor windows (e.g., query descriptor editor window 381), and an object manager or "inspector" window 391 (with object explorer 397). The main window 361 itself comprises main menu 362, tool bar buttons 363, and component palette 364. Main menu 362 lists user-selectable commands, in a conventional manner. For instance, the main menu invokes File, Edit, View submenus, and the like. Each submenu lists particular choices which the user can select. Working in conjunction with the main menu, toolbar 363 provides the user with shortcuts to the most common commands from the main menu. The toolbar is configurable by the user for including icons for most of the menu commands. Each editor, such as editor 381, is a full-featured editor that provides access to text in a given application project, such as Java code or SQL statements.

Forms, such as form 371, are the focal point of nearly every application which one develops in the environment. In typical operation, the user employs the form like a canvas, placing and arranging "components" on it to design the parts of one's user interface. The components themselves are the basic building blocks of applications developed within the environment. Available components appear on the component palette 364, which is displayed as part of the main window 361. The form can be thought of as a component that contains other components. One form serves as the main form for the application; its components interact with other forms and their components to create the interface for an application under development. In this manner, the main form serves as the main interface for an application, while other forms typically serve as dialog boxes, data entry screens, and the like.

During "design" mode operation of the system, the user can change the properties of the form, including resizing the form and moving it anywhere on screen. The form itself includes standard features such as a control menu, minimize and maximize buttons, title bar, and resizeable borders. The user can change these features, as well as other "properties" of the form, by using the object inspector window 391 to edit the form during design time. Thus, properties define a component's appearance and behavior.

Components are the elements which a user employs to build his or her applications. They include all of the visible parts of an application, such as dialog boxes and buttons, as well as those which are not visible while the application is running (e.g., system timers). In the programming environment 360, components are grouped functionally on different pages of the component palette 364. Each functional group is identified by a tab member, which includes a label indicating the particular nature of the group. For example, components that represent the Microsoft Windows common dialog boxes are grouped on the "Dialogs" page of the palette. The palette can incorporate user-created custom controls, which the user installs onto the palette. Additionally, the user can install third-party components.

The object inspector window 391 enables the user to easily customize the way a component appears and behaves in the application under development. The inspector 391 comprises a properties page 393 having object property fields (e.g., field 392); an events page 394 displays, in a similar manner, object method fields. The object property field 392 shows the type and value of the currently-selected property. The properties page 391, therefore, serves to list the attributes of a component placed on a form (or the form itself) which can be customized. The events page, on the other hand, lists "event handlers" for a particular component. Event handlers are specialized procedures which may include user-provided program code.

The following description will focus on those features of the development system 200 which are helpful for understanding methods of the present invention for implementing Java string reference lookups of column names in the visual development environment.

Methods for reference lookups of column names

A. Database components

Figure 4:
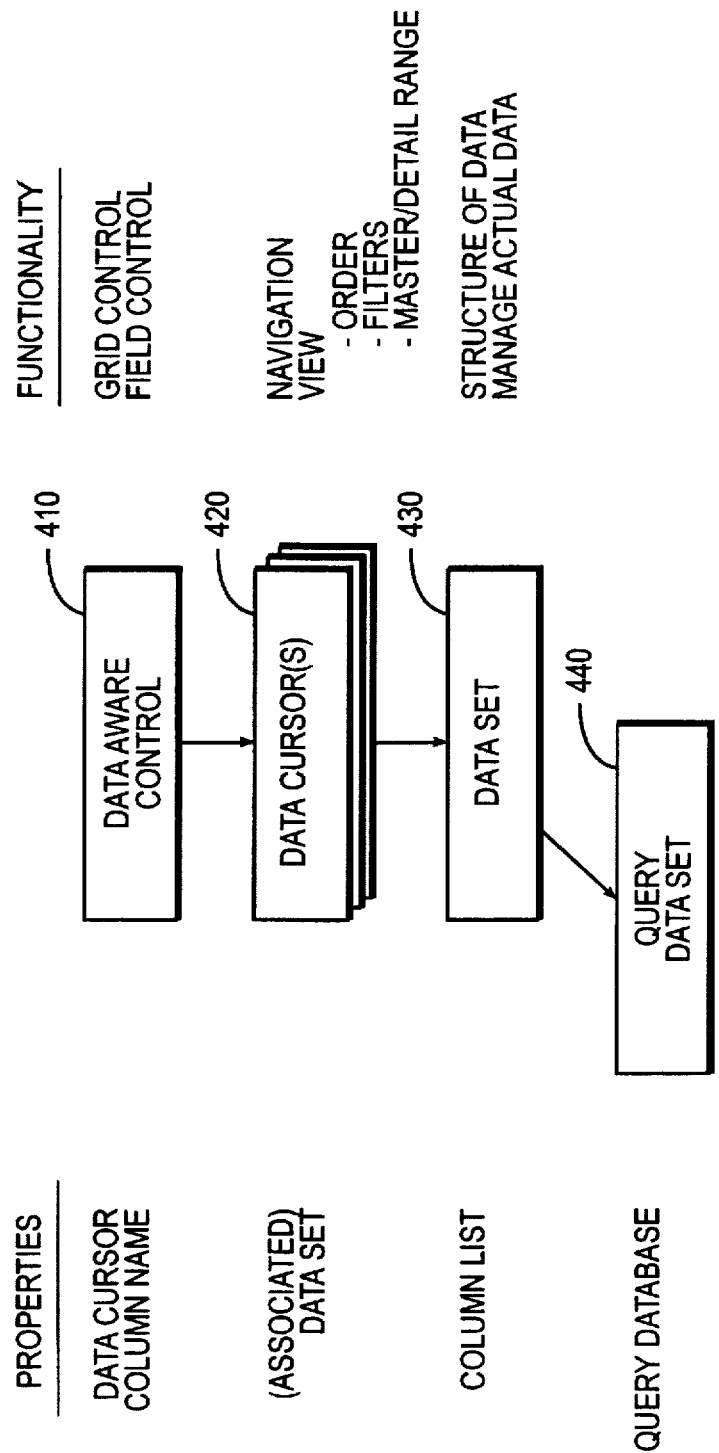
FIG. 4 is a block diagram illustrating database components employed in the visual development system of the present invention.

FIG. 4 is a block diagram illustrating programmatic database access in the system. At the level of the user interface, the (designer) user creates a database form by placing one or more "data aware" controls on a form. Each data aware control, which includes grid control and field control functionality, communicates with a data cursor, such as shown at 420. A data cursor is responsible for navigation through a database table, as well as supporting various views of database tables. Each such view can impose an order (e.g., ORDER BY LAST_NAME) as well as a filter (e.g., SET FILTER TO LAST_NAME>SMITH). Data cursor 420 also supports a range, such as required for master/detail relationships.

Programmatic database access is achieved by opening a data cursor (e.g., data cursor 420) on a "data set." A data set component, such as data set 430, is responsible for the structure of the data—that is, understanding its actual storage. As shown in the figure, multiple data cursors can exist for each data set (e.g., for supporting different, simultaneous views of that data). A query data set, such as query data set 440, represent a derivation of a data set: a data set which represents the result of a particular query. The array or list of columns—column list 435—exists as a property of the data set 430.

B. Reference cache methodology

Reference lookups of column names, in accordance with the present invention, occurs as follows. At the outset, a reference cache is established, for caching references (e.g., pointers or handles) to strings. When a name request is received (e.g., "Account No."), a column name lookup is required, for determining the corresponding ordinal for the column. In an application program, for instance, a request for processing database information might include reference to a particular database column, Customer ID, by name: iCurrCust=Customer.fetchAsInteger("Customer ID"). Internally, to process information from that column, the system must determine the ordinal position for that column.

The first time the system performs a request with a given name, the system will not find the name in the reference cache. Accordingly, it must perform a conventional lookup (e.g., hash lookup), including performing a more-expensive string comparison operation. Once the name is located, it is placed in the reference cache.

In a preferred environment, the reference cache is constructed as a least-recently allocated cache. This allocation occurs in a round-robin fashion, with the oldest item allocated being the first item discarded or "bumped" from cache when the cache is full. Alternatively, a least-recently used (LRU) aging scheme may be employed. For most embodiments, however, the processing overhead of an LRU approach is not offset by better cache performance. The following information is stored with each cache entry:

(1) a reference (e.g., four-byte pointer or handle to a string); and (2) an ordinal entry (i.e. the corresponding database ordinal).

In a preferred environment, the cache is set to a size of twenty entries or items, as most database tables will have twenty or fewer columns in use at a given time.

The next time a request is performs or the particular column name, the system performs an in-line comparison on the cache entries. If a matching entry is found, the system passes the corresponding ordinal back. A sequence of in-line tests is preferably used instead of stepping through an array (i.e., by incrementing a subscript value) because it is more efficient, particularly in Java-based environments. Array processing in such environments is relatively expensive. For instance, overhead is incurred with subscript processing of an array. Additional overhead is incurred with computationally-expense array bound checking which occurs in such environments. By avoiding an array approach, the overhead which accompanies array processing is avoided. Moreover, when programs are compiled (i.e., by a native compiler or by a just-in-time compiler), the sequence of comparison operations exists as a sequence of rapid, in-line 32-bit comparison operations (e.g., integer comparison operations).

On subsequent lookup of a string from a user application, the system proceeds with comparison of existing items in the cache, using the (32-bit or four byte) reference for the column name string (instead of the more-expensive hash table/string comparison approach). Here, when the expensive lookup is first performed, a reference to that column name as well as the column ordinal are stored in the cache. As a result, subsequent lookups do not require hash lookups or string comparison operations.

C. Immutable strings and garbage collection

The foregoing technique, when implemented in the Java programming environment, exploits two features: immutable strings and garbage collection. In conventional programming environments, such as C or C++, one does not know the "life" (i.e., duration of allocation) of a string which is passed into a function call. In the Java environment, on the other hand, such a problem does not exist. Firstly, Java strings are immutable—that is, strings, once created, cannot be modified. Here, such strings are initialized at construction time with a passed-in value; for the lifetime of the string, its size and content are dictated by that passed-in value. Secondly, each string is guaranteed not to be deallocated. This results from Java's garbage collection memory management scheme. As long as an object (e.g., a string) is being referenced, it will not be free (i.e. deallocated). Since the reference cache continues to reference the column name strings which it caches, the strings themselves will not be deallocated and, thus, are safe to compare.

D. Simplified database syntax

The approach affords the simplified, name-based syntax for data access. Consider, for instance, the following example.

DataCursor Customer;

int iX;

iX=Customer*getInt("Credit Limit");

The syntax allows one to retrieve information (here, an integer) by use of the column or field name (text string) Similarly, information can be retrieved from a particular row (corresponding to a record upper) as follows.

DataRow row;

int iY;

iY=row*getInt("Price")

Thus as shown, data can be accessed by use of the column name, yet at the same time provide execution comparable to ordinal-based access.

E. Source code embodiment

The source code embodiment comprises a set of routines that, when given a column name (string), function to return an ordinal for the column. The entry point for the set of routines, getOrdinal, may constructed as follows (using the Java programming language).

```
final int getOrdinal(String columnName)
    throws DataSetException
{
    // This is faster than using an array. In Java arrays are
    // range checked and there is overhead for subscripting.
    //
    if (columnName == name0) return ordinal0;
    if (columnName == name1) return ordinal1;
    if (columnName == name2) return ordinal2;
    if (columnName == name3) return ordinal3;
    if (columnName == name4) return ordinal4;
    if (columnName == name5) return ordinal5;
    if (columnName == name6) return ordinal6;
    if (columnName == name7) return ordinal7;
    if (columnName == name8) return ordinal8;
    if (columnName == name9) return ordinal9;
    if (columnName == name10) return ordinal10;
    if (columnName == name11) return ordinal11;
    if (columnName == name12) return ordinal12;
    if (columnName == name13) return ordinal13;
    if (columnName == name14) return ordinal14;
    if (columnName == name15) return ordinal15;
    if (columnName == name16) return ordinal16;
    if (columnName == name17) return ordinal17;
    if (columnName == name18) return ordinal18;
    if (columnName == name19) return ordinal19;
    // Not in cache, therefore
```

```
        // fall-thru to more-expensive hashing lookup.
        int ordinal = findColumn(columnName).ordinal;
        setOrdinal(columnName, ordinal);
        return ordinal;
}
```

As shown, the Java routine is invoked with a single parameter, columnName, a Java string reference (i.e., handle or pointer) for the column name. At the outset, the routine or method attempts to match the reference to the then-current cache of string references. This is done by performing a sequence of comparisons of the passed-in reference against currently-cached references. Note particularly that such comparisons are not string comparisons but, instead, are simple reference (e.g., 32-bit integer) comparisons. As a further optimization, Java arrays are purposely not used, so that expensive array processing overhead is avoided (as previously described).

The very first time through this series of checks, there will be no hits, as the reference is completely empty at this point (i.e., no references have been stored yet). Accordingly, execution proceeds to the findColumn subroutine call, to perform a more-expensive lookup (e.g., string-based hash lookup). This will return an ordinal, which can now be stored in the reference list or cache (done by invoking a setOrdinal routine or method). Regardless of execution path through the method, getOrdinal concludes by returning an ordinal for the passed-in column.

The findColumn method itself may be implemented as follows.

```
private final Column findColumn(String columnName)
    throws DataSetException
    {
        int count = columns.length;
        Column column;
        checkList( );
        Column[] searchColumns = scopedColumns != null
            ? scopedColumns : columns;
        for (int ordinal = 0; ordinal < count; ++ordinal) {
            if
(searchColumns [ordinal].getColumnName( ).equalsIgnoreCase
(columnName))
            {
                return searchColumns[ordinal];
            }
        }
        DataSetException.throwUnknownColumnName( );
        return null;
    }
//
// Alternatively, convert to high speed "case insensitive" hash look up
```

In an embodiment where contemporaneously-used column names numbers twenty or fewer, the method is preferably implemented as a sequential lookup, as shown above. In the event that the number instead exceeds twenty, the method is alternatively implemented using conventional hashing methodology. "Hashing" is a well-known technique for providing fast, direct access to a specific information, such as a data record, which is stored at a particular location on the basis of the record's value. In hashing, each information record is stored at a location whose address is computed as some function (the "hash finction") of some value or field of that record (the "hash field" or "hash key"). To initially store a record, the system computes the hash address for the record and then places the record at that computed position. For retrieval of the record in subsequent operations, the system, given the hash field value, can perform the same computation as before, thus computing the position from which the record should be fetched.

In hashing, the elements are typically stored in a table, called the "hash table." The hash table, which is typically organized as an array, stores the data elements or, alternatively, stores pointers to a list of elements. Thus, a hash table is usually implemented either as an array of buckets, with each bucket holding one or more slots for elements, or as an array of pointers, which point to lists of elements. Further description of hashing may be found in Sedgewick, R., Algorithms in C, Addison-Wesley, 1990, pp. 231–244, the disclosure of which is hereby incorporated by reference.

Whether a linear string comparison or hash lookup is performed, the findColumn method call entails a more expensive string comparison operation (e.g., when invoking the equalsIgnoreCase function call shown above). Once a match is found, a corresponding column data structure is returned. This includes ordinal information for a particular column, as well as descriptor information (e.g., column type, size, and the like). The ordinal is installed into the reference cache by the setOrdinal routine method.

The setOrdinal routine method itself may be constructed as follows.

```
private final void setOrdinal(String columnName, int ordinal) {
    // Least recently allocated.
    //
    if (++slot > 19)
        slot = 0
    switch (slot) }
        case 0: name0 = columnName; ordinal0 = ordinal; break;
        case 1: name1 = columnName; ordinal1 = ordinal; break;
        case 2: name2 = columnName; ordinal2 = ordinal; break;
        case 3: name3 = columnName; ordinal3 = ordinal; break;
        case 4: name4 = columnName; ordinal4 = ordinal; break;
        case 5: name5 = columnName; ordinal5 = ordinal; break;
        case 6: name6 = columnName; ordinal6 = ordinal; break;
        case 7: name7 = columnName; ordinal7 = ordinal; break;
        case 8: name8 = columnName; ordinal8 = ordinal; break;
        case 9: name9 = columnName; ordinal9 = ordinal; break;
        case 10: name10 = columnName; ordinal10 = ordinal; break;
        case 11: name11 = columnName; ordinal11 = ordinal; break;
        case 12: name12 = columnName; ordinal12 = ordinal; break;
        case 13: name13 = columnName; ordinal13 = ordinal; break;
        case 14: name14 = columnName; ordinal14 = ordinal; break;
        case 15: name15 = columnName; ordinal15 = ordinal; break;
        case 16: name16 = columnName; ordinal16 = ordinal; break;
        case 17: name17 = columnName; ordinal17 = ordinal; break;
        case 18: name18 = columnName; ordinal18 = ordinal; break;
        case 19: name19 = columnName; ordinal19 = ordinal; break;
    }
}
```

As shown, the method implements a least-recently allocated cache for columns which have been encountered. Although least—recently used (LRU) methodology might be employed instead, the overhead of such an approach generally makes it unattractive for the present application. In operation, the setOrdinal method cycles through a collection of slots (wrapping as necessary), for deriving a slot number. The slot number is then used to set a corresponding name slot in the reference cache to store the string reference (e.g., 32-bit quantity) for the column name. In conjunction with this operation, a corresponding ordinal slot in the cache stores the ordinal value associated with that column. Thereafter, the setOrdinal method has completed and may return.

During runtime operation of an end user application, the reference cache fills with references to strings of those columns actually employed. Subsequent loops through the getOrdinal method results in cache hits, whereupon the corresponding ordinal can be returned rapidly (i.e., without performing a string comparison operation). In this fashion, the present invention provides named-based column references in one's computer program, but without incurring repeated, expensive string comparison operations.

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a development system for creating a program which includes programmatic access to columns of database tables, an improved method for determining an ordinal representing an offset within a database table of a column which has been referenced within a program by name, the method comprising:

allocating memory for storing a plurality of reference cache entries, each cache entry storing a reference to a text string representing a name for a given column and further storing an ordinal for the given column;

upon a request for an ordinal of a particular column, said request including the text string which represents the name for the particular column,
   (i) attempting to determine the ordinal by examining the reference cache for an entry storing a reference which matches a corresponding reference to a text string representing the name for the particular column;
   (ii) if the reference cache has no such entry,
      (1) determining the ordinal based, at least in part, on comparison of the text string representing the name for the particular column, and
      (2) updating the reference cache by storing a cache entry having a reference to the text string and the ordinal for the particular column, so that subsequent requests for the ordinal of the particular column can be satisfied based on examination of the reference cache; and
   (iii) providing the determined ordinal for the particular column, so that the program has programmatic access to information stored at the particular column.

2. The method of claim 1, wherein said programmatic access includes an expression in the program which references a column by a corresponding column name.

3. The method of claim 2, wherein the column name comprises a text string describing information stored by the corresponding column.

4. The method of claim 2, wherein said expression in the program which references a column by a corresponding column name includes a reference to a column data value in a form of: <database table name>.<column name>.

5. The method of claim 1, wherein each ordinal comprises an integer data value identifying a column as being located at a particular ordinal offset within a database table.

6. The method of claim 1, wherein said allocating memory step comprises: allocating memory for storing at least twenty reference cache entries.

7. The method of claim 1, wherein each reference to a particular text string comprises a fixed-length data value serving as a handle to the particular text string.

8. The method of claim 1, wherein each reference to a particular text string comprises a 32-bit data value serving as a handle to the particular text string, the particular text string itself remaining allocated by the system so long as the particular text string is being referenced within the system.

9. The method of claim 8, wherein the particular text string is deallocated by a garbage collection memory management subsystem, when the particular text string is no long being referenced within the system.

10. The method of claim 8, wherein the particular text string comprises an immutable text string whose contents cannot change while the particular text string exists within the system.

11. The method of claim 1, wherein text strings stored within the system comprise Java-compatible text strings and wherein each reference to a particular text string comprises a 32-bit quantity referencing a Java-compatible text string.

12. The method of claim 1, wherein before said updating step further includes:

if the reference cache is already filled, discarding from cache the least-recently allocated cache entry.

13. The method of claim 1, wherein said comparison of the text string at step (ii)(1) includes performing a hash lookup of the text string against text strings for names of other columns of the database table.

14. The method of claim 1, wherein said comparison of the text string at step (ii)(1) includes performing a sequential lookup of the text string against text strings for names of other columns of the database table.

15. The method of claim 1, wherein subsequent requests for the ordinal of the particular column are satisfied by reading the stored ordinal directly from the reference cache.

16. The method of claim 1, wherein said subsequent requests for the ordinal occur as a result of repeated requests for the particular column within a database scan loop.

17. The method of claim 1, further comprising:

employing the determined ordinal to retrieve a data value for the column from the database table.

18. The method of claim 1, wherein step (i) includes:

using a sequence of rapid, in-line comparisons involving a simple data type for attempting to determine the ordinal.

19. The method of claim 18, wherein said simple data type comprises a 32-bit reference for a column name string.

20. The method of claim 18, wherein said sequence of rapid, in-line comparisons comprises integer comparison operations.

* * * * *